(12) United States Patent
Clodic et al.

(10) Patent No.: US 7,073,348 B2
(45) Date of Patent: Jul. 11, 2006

(54) METHOD AND SYSTEM FOR EXTRACTING CARBON DIOXIDE BY ANTI-SUBLIMATION FOR STORAGE THEREOF

(75) Inventors: Denis Clodic, Paris (FR); Mourad Younes, Paris (FR)

(73) Assignee: Armines, Paris (FR)

( * ) Notice: Subject to any disclaimer, the term of this patent is extended or adjusted under 35 U.S.C. 154(b) by 92 days.

(21) Appl. No.: 10/470,828

(22) PCT Filed: Jan. 25, 2002

(86) PCT No.: PCT/FR02/00316

§ 371 (c)(1),
(2), (4) Date: Apr. 7, 2004

(87) PCT Pub. No.: WO02/060561

PCT Pub. Date: Aug. 8, 2002

(65) Prior Publication Data

US 2004/0148961 A1    Aug. 5, 2004

(30) Foreign Application Priority Data

Jan. 30, 2001   (FR)   ................................. 01 01232

(51) Int. Cl.
*B01D 9/04*     (2006.01)
*C02F 1/22*     (2006.01)

(52) U.S. Cl. ......................................... 62/532; 62/537
(58) Field of Classification Search ................ 62/532, 62/537, 335, 612

See application file for complete search history.

(56) References Cited

U.S. PATENT DOCUMENTS

| 2,738,658 A | * | 3/1956 | Brouson ....................... 62/638 |
| 2,996,891 A | * | 8/1961 | Tung ............................ 62/637 |
| 4,152,129 A | * | 5/1979 | Trentham et al. ............. 62/623 |
| 4,451,273 A | * | 5/1984 | Cheng et al. ................. 62/637 |
| 6,082,133 A | * | 7/2000 | Barclay et al. ............... 62/619 |
| 6,751,984 B1| * | 6/2004 | Neeraas et al. ............... 62/612 |

FOREIGN PATENT DOCUMENTS

| DE | 39 24 908 A | 1/1991 |
| DE | 44 30 800 A | 3/1996 |
| DE | 195 13 050 A | 10/1996 |
| JP | 54 061097 A | 5/1979 |

OTHER PUBLICATIONS

International Search Report, Jun. 3, 2002.

* cited by examiner

*Primary Examiner*—William C. Doerrler
(74) *Attorney, Agent, or Firm*—RatnerPrestia

(57) ABSTRACT

A method and system for extracting and storing carbon dioxide from fumes derived from the combustion of hydrocarbons in an apparatus designed in particular for the production of mechanical energy comprises: exchangers (11, 25) and a dehydrator (56), for extracting water from the fumes in liquid form at a pressure more or less equal to atmospheric pressure; an integrated cascaded refrigerating apparatus (18, 22, 25, 26, 28, 32, 33, 34, 39, 40), for cooling the fumes at a pressure more or less equal to atmospheric pressure and at a temperature such that the carbon dioxide passes directly from the vapor state to the solid state, via an anti-sublimation process; a fixed (49) and/or removable (51) reservoir and suction means, in particular a pneumatic pump (48), for storing the carbon dioxide in liquid form after defrosting.

24 Claims, 3 Drawing Sheets

FIG_1

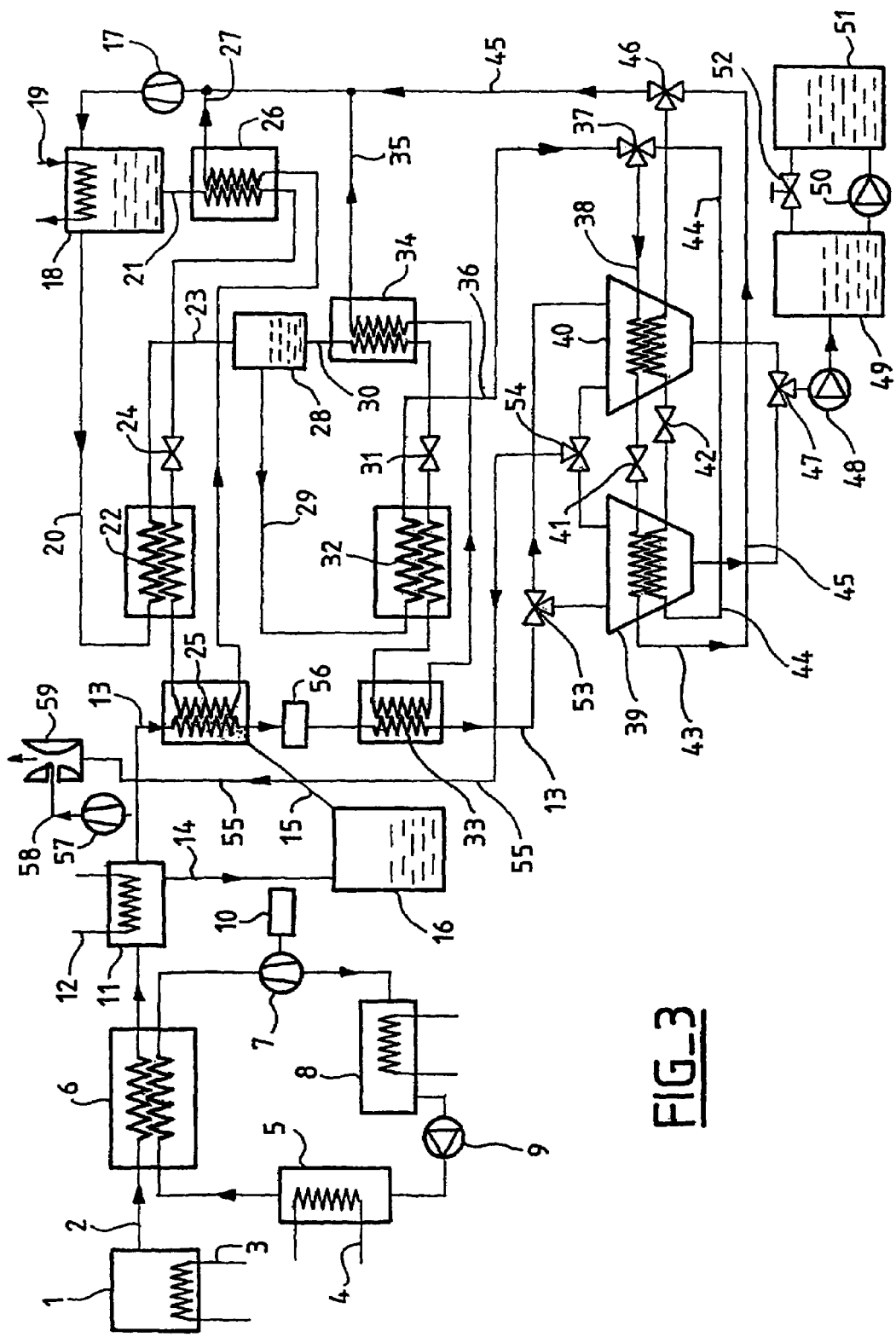
FIG_3

METHOD AND SYSTEM FOR EXTRACTING CARBON DIOXIDE BY ANTI-SUBLIMATION FOR STORAGE THEREOF

The present invention pertains to a method and a system, making possible the extraction (the capture) of carbon dioxide by anti-sublimation at atmospheric pressure. It pertains, particularly, to a method and a system making possible the capture of carbon dioxide present in the fumes circulating in the smokestacks of electricity or heat production plants or in the exhaust pipelines of propulsion engines. This capture of carbon dioxide is performed for storage thereof.

The emissions of carbon dioxide or $CO_2$ linked with combustions, either of heating systems, production of electric energy or propulsion of vehicles, lead to an increase in the atmospheric $CO_2$ concentration which is considered to be unacceptable in the long term. The Kyoto Protocol consists of agreements made by the signatory countries to limit these emissions. The energy temperance and efficiency are not sufficient to limit the $CO_2$ concentrations at the acceptable values. The capture of carbon dioxide and its sequestration are indispensable goals for economic development as well as for maintaining atmospheric concentrations at levels limiting changes in the climate.

The present invention pertains to a method for capturing carbon dioxide that can be applied to any combustion system. The method according to the present invention is characterized in that it does not modify the energy efficiency of propulsion engines or electricity propulsion or production turbines using such combustion systems. $CO_2$ is captured according to the anti-sublimation process at more or less atmospheric pressure with no or extremely slight increase in consumption of energy. The design of the system for an automobile heat engine shall be described by way of example.

Method

The present invention pertains to a method for extracting carbon dioxide from fumes derived from the combustion of hydrocarbons in an apparatus designed in particular for the production of mechanical energy. The method according to the present invention comprises the step of cooling said fumes at a pressure more or less equal to atmospheric pressure at a temperature such that the carbon dioxide passes directly from the vapor state to the solid state via an anti-sublimation process.

Preferably, the step consisting of cooling the said fumes at a pressure more or less equal to atmospheric pressure at a temperature such that the carbon dioxide passes directly from the vapor state to the solid state, via an anti-sublimation process, additionally comprises the step of cooling the mixture of nitrogen and carbon dioxide, providing frigories by means of a fractionated distillation of a mixture of refrigerant fluids. This fractionated distillation of the mixture of refrigerant fluids is carried out at decreasing, multistage temperatures according to a cycle comprising a compression phase and subsequent condensation and evaporation phases.

Preferably, the step consisting of cooling the said fumes at a pressure more or less equal to atmospheric pressure at a temperature such that the carbon dioxide passes directly from the vapor state to the solid state, via an anti-sublimation process, is followed by a step of melting the carbon dioxide in a closed chamber. The pressure and the temperature in the said closed chamber progress up to the triple point of carbon dioxide as the mixture of refrigerant fluids, by subcooling, supplies calories in the said closed chamber.

Preferably, the mixture of refrigerant fluids successively ensures:
the melting of the carbon dioxide in the said closed chamber, and
the anti-sublimation of the circulating carbon dioxide, in an open circuit, in a symmetric chamber of the previous one.

The melting and the anti-sublimation of the carbon dioxide are alternately carried out in one and the other of the said chambers: the one being closed, the other being open.

Preferably, the method according to the present invention additionally comprises the step of storing the carbon dioxide in liquid form in a reservoir, in particular a removable reservoir.

Preferably, the step of storing the carbon dioxide in liquid form in an in particular removable reservoir comprises the following steps:
the step of suctioning the liquid carbon dioxide contained in the said closed chamber,
the step of restoring the pressure in the said closed chamber at a pressure close to atmospheric pressure,
the step of transferring the liquid carbon dioxide into the said reservoir.

Preferably, the method according to the present invention additionally comprises the step of discharging the nitrogen to the outer air after successive extractions of the water and carbon dioxide vapors contained in the said fumes.

Preferably, the method according to the present invention additionally comprises the step of:
transferring the frigories contained in the nitrogen discharged to the outer air to the fumes, and of
thus contributing to the cooling of the said fumes.

Preferably, the method according to the present invention additionally comprises the step of cooling the said fumes to the anti-sublimation temperature of carbon dioxide at a pressure more or less equal to atmospheric pressure by using the thermal energy available in the said fumes without additional supply of energy.

Preferably, for using the thermal energy available in the said fumes, the method according to the present invention additionally comprises the following steps:
the step of reheating and then vaporizing the water by means of the said fumes to produce water vapor under pressure,
the step of releasing said water vapor under pressure into a turbine producing mechanical or electric energy.

Preferably, the method according to the present invention is such that the step of cooling the said fumes at a pressure more or less equal to atmospheric pressure at a temperature such that the carbon dioxide passes directly from the vapor state to the solid state via an anti-sublimation process additionally comprises the step of extracting water from the said fumes in liquid form at a pressure more or less equal to atmospheric pressure.

Preferably, an air or water exchanger is used for extracting all or part of the water from the said fumes in liquid form at a pressure more or less equal to atmospheric pressure.

Preferably, the method according to the present invention additionally comprises the step of extracting the entire residual quantities of water in the said fumes by using a refrigerating exchanger and/or a dehydrator.

System

The present invention also pertains to a system for extracting carbon dioxide from the fumes derived from the combustion of hydrocarbons in an apparatus designed in particular for production of mechanical energy.

The system according to the present invention comprises cooling means for cooling the said fumes at a pressure more or less equal to atmospheric pressure at a temperature such that the carbon dioxide passes directly from the vapor state to the solid state, via an anti-sublimation process.

Preferably, the cooling means for cooling the said fumes at a pressure more or less equal to atmospheric pressure at a temperature such that the carbon dioxide passes directly from the vapor state to the solid state, via an anti-sublimation process, additionally comprise an integrated cascaded refrigerating apparatus for cooling the mixture of nitrogen and carbon dioxide by supplying frigories, by means of a fractionated distillation, of a mixture of refrigerant fluids. The fractionated distillation of the mixture of refrigerant fluids is carried out at decreasing, multistage temperatures according to a cycle comprising a compression phase and successive condensation and evaporation phases. The refrigerating apparatus comprises: a compressor, a partial condenser, a separator reservoir, evaporation condensers, evaporators for cooling fumes, liquid-vapor exchangers, anti-sublimation evaporators, pressure reducing valves.

Preferably, the system according to the present invention additionally comprises a closed chamber, through which passes a circuit in which a mixture of refrigerant fluids circulates. The pressure and temperature in said closed chamber progress up to the triple point of carbon dioxide, as:
the mixture of refrigerant fluids, by subcooling, supplies calories in said closed chamber,
the said carbon dioxide passes from the solid state to the liquid state.

Preferably, the mixture of refrigerant fluids successively ensures the melting of the carbon dioxide in the said closed chamber and the anti-sublimation of the carbon dioxide circulating in an open circuit in a symmetric chamber of the previous one. The melting and anti-sublimation of the carbon dioxide are alternately carried out in one and the other of the said chambers: the one being closed, the other being open.

Preferably, the system according to the present invention additionally comprises storing means, in particular a fixed and/or removable reservoir for storing the carbon dioxide in liquid form.

Preferably, the means for storing carbon dioxide in liquid form in a fixed and/or removable reservoir additionally comprise suction means, in particular a pneumatic pump. The suction means:
suction the liquid carbon dioxide contained in the said closed chamber,
restore the pressure in the said closed chamber to a pressure close to atmospheric pressure,
transfer the liquid carbon dioxide into the said reservoir.

Preferably, the system according to the present invention additionally comprises compression and/or suction means for discharging the nitrogen to the outer air after successive extractions of the water and carbon dioxide vapors contained in the said fumes.

Preferably, the system according to the present invention additionally comprises transfer means for transferring the frigories contained in the nitrogen discharged to the outer air to the fumes and thus contributing to the cooling of the said fumes.

Preferably, the system according to the present invention additionally comprises means for recovering the thermal energy available in the said fumes for cooling, without additional supply of energy, the said fumes to the anti-sublimation temperature of the carbon dioxide at a pressure more or less equal to atmospheric pressure.

Preferably, the means for recovering the thermal energy available in said fumes comprise:
reheating means, in particular an exchanger, for reheating and vaporizing the water by means of the said fumes and for producing water vapor under pressure,
releasing means, in particular a turbine, for releasing the said water vapor under pressure and producing mechanical or electric energy.

Preferably, the means for cooling said fumes at a pressure more or less equal to atmospheric pressure at a temperature such that the carbon dioxide passes directly from the vapor state to the solid state, via an anti-sublimation process, additionally comprise extracting means, in particular exchangers, for extracting water from the said fumes in liquid form at a pressure more or less equal to atmospheric pressure.

Preferably, the extracting means for extracting all or part of the water from the said fumes in liquid form at a pressure more or less equal to atmospheric pressure comprise an air exchanger or water exchanger.

Preferably, the extracting means comprise a refrigerating exchanger and/or a dehydrator for extracting the entire residual quantities of water in the said fumes.

GENERAL DESCRIPTION OF THE METHOD AND SYSTEM ACCORDING TO THE PRESENT INVENTION

An embodiment variant of the present invention will now be described in a general manner. Exhaust gases, also called fumes, are typically composed of carbon dioxide ($CO_2$), water vapor ($H_2O$) and nitrogen ($N_2$). Trace components, such as CO, NOx, unburned hydrocarbons, etc. are also found (all the trace gases in the fumes represent contents generally less than 1% to 2%).

Table 1 shows typical molar and mass compositions of fumes at the exhaust of a combustion engine.

TABLE 1

|  | $CO_2$ | $H_2O$ | $N_2$ |
|---|---|---|---|
| Molar composition (%) | 12.7 | 13.7 | 73.6 |
| Mass composition (%) | 19.5 | 8.6 | 71.9 |

According to the method of the present invention, these fumes are cooled both to recover the mechanical energy and to lower their temperatures to slightly above ambient temperature. They are then cooled by a refrigerating cycle at progressively low temperature in order to make possible the anti-sublimation of the $CO_2$ at a temperature that is close to −80° C. and at a pressure that is about atmospheric pressure.

The term anti-sublimation refers here to a direct gas/solid phase change that occurs when the temperature of the gas in question is below that of the triple point. FIG. 1 recalls the coexistence scheme of solid, liquid and vapor phases in the pressure temperature diagram. This diagram applies to any pure body. Below the triple point, changes occur directly between the solid phase and the vapor phase. The passage from solid to vapor is called sublimation. There is no term commonly used to designate the reverse passage. The term anti-sublimation was used, in the present invention, to designate the direct passage from the vapor phase to the solid phase.

The thermodynamic data on the fumes show that the energy available from 900° C. to 50° C. is slightly greater than 1,000 kJ/kg. The example described shows that it is possible to convert 34% to 36% of this thermal energy into mechanical energy by a single cycle of a steam turbine, which, by assuming an alternator output of 0.9, makes it possible to recover 30.5% to 32.5% electric energy.

The system according to the present invention consists, on the one hand, of a device which produces energy, making possible the conversion of thermal energy into mechanical and/or electric energy, and a device which consumes energy consisting of an integrated refrigerating apparatus of a cascaded design. The exhaust gases progress thermally from about +900° C. to −90° C. During this cooling, the gases produce energy from 900° C. to about 50° C., then consume energy from ambient temperature (for example, 40° C.) to −90° C. The example described shows that the energy available is significantly greater than the energy consumed and thus makes it possible, successively, to extract water vapor, and then $CO_2$, from the fumes, simply discharging the nitrogen and trace gases, whose dew points are less than −90° C., into the atmosphere.

The size of the steam turbine depends on the fume flow to be treated. For a heat engine of an automobile, it is a small turbine that produces an electric energy of about 3 to 30 kW depending on the power and operating speed of the heat engine itself. The vaporization of the water of the mechanical energy producing circuit is performed by exchange between a closed water circuit under pressure and the exhaust pipeline. Actually, the extraction of exhaust gases from the heat energy by a water circuit makes it possible to limit the mechanical disturbance on the exhaust gases, which would bring about, for example, a gas turbine operating directly on the fumes. It is known that the operating parameters of diesel or gasoline engines are strongly disturbed by the changes in pressure at the exhaust. If these changes in pressure at the exhaust are changed significantly, they have the effect of reducing the energy efficiency of the engines. The countercurrent design of the exchanger and the very large temperature gradient along the circuit of the fumes makes it possible to reheat and to vaporize the water of the mechanical energy producing circuit. In the case of the example described, the condensation temperature is equal to 40° C. This temperature of 40° C. corresponds to the typical summer conditions of an air condenser.

This water is reheated to a saturation temperature ranging from 310° C. to 340° C.; at these temperatures, it corresponds to a saturation pressure in the heating tube ranging from about 99 bar to 145 bar. The pressure level is adjusted depending on the operating conditions of the engine. To better adjust the pressure level, the water flow is changed starting from the measurement of the temperature of the exhaust gases at the inlet and/or at the outlet of the exchanger. The flow of the fumes is highly variable but is known by the knowledge of the engine speed and the flow of the motor fuel. These data are available both by the engine tachometer and the control electronics of the motor fuel injection. These data make it possible to predict the range of water flow to be circulated in the energy recovery circuit, the pressure in the water circuit being adjusted depending on the temperature of the exhaust gases at the inlet and/or at the outlet of the exchanger.

At this boiling pressure, the liquid is therefore converted into vapor. The vapor itself is then overheated up to typical temperatures of 400° C. to 550° C. depending on the available temperature level of the exhaust gases. Then the vapor is released in the body of the turbine. It is thus possible to extract the mechanical energy from the fumes. The turbine may drive an electric alternator, a momentum wheel or even directly the compressor of the refrigerating system. The driving version of an electric alternator yields more flexibility according to the different mission profiles of a heat engine of a vehicle.

The data below evaluate the available quantities of mechanical energy in the case of two operations of the cycle.

In a first case, the condensation temperature is equal to 40° C. and the boiling temperature is equal to 310° C. In the second case, the condensation temperature is still equal to 40° C., but the boiling temperature is equal to 340° C. On the other hand, the vapor is overheated in the first case to 400° C., and in the second case to 500° C. The examples described are chosen to illustrate different operating conditions of the temperatures of the exhaust gases and to provide typical numbers of available powers, expressed as a function of the flow M of fumes, itself expressed in kg/sec. They make it possible to generalize the method according to the present invention to any high-temperature fume discharge pipeline containing $CO_2$. The recovery of energy from the fumes therefore supplied them with typical temperatures ranging from between 750° C. and 900° C. to temperatures of about 50° C. to 80° C.

The data below fix the orders of magnitude of the quantities of mechanical energy necessary for cooling the fumes, via a refrigerating cycle, to the anti-sublimation temperature of $CO_2$. Before arriving at the exchangers of the refrigerating device, the fumes are cooled from 50° C. to ambient temperature. The heat exchange for cooling the fumes from 50° C. to ambient temperature is carried out in an air or water exchanger. According to the outer temperature level and according to the trace component contents, the water contained in the flow of fumes is partially condensed in this exchanger because the dew point for concentrations of about 86 g of water per kg of dry fume is about 50° C. However, considering the presence of trace gas in the fumes, the water may be acidic and have specific dew points greater than those of pure water. The dew points in this case typically range from 50 to 100° C. It is described below how to proceed for condensing the water vapor without taking into account the trace gases in the fumes which elevate the dew point.

The condensed water may, according to these features, be either directly discharged, or may be stored in order to be pretreated before discharge. Below the ambient temperature, the fumes are cooled in a circuit which comprises a plurality of exchange segments. They are thus brought to a temperature lower than the anti-sublimation temperature of $CO_2$ at atmospheric pressure or close to atmospheric pressure.

Between the air exchanger and the first integrated, cascaded cooling exchanger, the flow of the fumes M is changed because the water vapor that is contained therein is condensed. If the mass concentrations are equal to:

$CO_2$=19.5%, $H_2O$=8.6% and $N_2$=71.9%, respectively, the flow of the fumes M is more or less equal to the anhydrous flow (by disregarding the concentrations of trace gases), i.e.:

$M_{N2+CO2}$=0.914 M.

This new anhydrous flow $M_{N2+CO2}$ continues its cooling in the different exchangers of the refrigerating system before arriving at the two anti-sublimation evaporators. The two anti-sublimation evaporators have an alternate operation. The fumes and the refrigerant fluid pass alternately through one or the other of the two evaporators.

During the anti-sublimation phase, the $CO_2$ frost is fixed on the external walls of the circuit of the exchanger located in the anti-sublimation evaporator. This deposit progressively creates an obstacle to the circulation of the cold fumes. After a certain operating time of this evaporator, the fume flows on the external part of the exchanger and the flows of refrigerant fluid on the inside of the exchanger are respectively switched over to the symmetric evaporator. In this second evaporator, the refrigerant fluid is evaporated on the inside of the evaporator and the $CO_2$ is deposited on the external surface of same. During this time, the first evaporator is no longer the site of evaporation, the temperature rises in the first evaporator. This rise in temperature is accelerated by circulating the refrigerant liquid before release in the exchanger of the first evaporator. The solid $CO_2$ is reheated from −78.5° C., which is the equilibrium temperature of the solid and gaseous phases at atmospheric pressure, to −56.5° C. and 5.2 bar, which are the pressure/temperature characteristics of the triple point, at which the three solid, liquid and gaseous phases therefore coexist. The solid $CO_2$ melts, i.e., passes from the solid phase to the liquid phase. The pressure in this exchanger increases with the rise in temperature.

Once the $CO_2$ is entirely in the liquid phase, it is transferred by pump into a heat-insulated reservoir. The pump is also capable of suctioning the residual gas, in particular $CO_2$. It is thus possible to restore the pressure inside the anti-sublimation evaporator from 5.2 bar to a pressure close to atmospheric pressure, so that the fumes may again penetrate same.

It is thus possible to carry out the next cycle and to carry out an anti-sublimation of the $CO_2$ contained in the cold fumes on the walls of the evaporator. The latter is again fed with refrigerant fluid. The cycle is continued, and so forth, alternately on the two low-temperature evaporators in parallel.

The method according to the present invention, which makes use of an anti-sublimation, is advantageous compared to the method that consists of passing from the gaseous phase to the liquid $CO_2$ phase. In fact, to pass directly from the gaseous phase to the liquid phase, it is necessary to increase the pressure of the fumes, at least up to 5.2 bar, and to lower their temperature to −56.5° C. In practice, this method involves lowering the temperature of the fumes to 0° C. to eliminate the water and then compressing the mixture of nitrogen and $CO_2$ to at least 6 bar. During this compression, the mixture of nitrogen and $CO_2$ will be reheated up to 120° C. It will again be necessary to cool it from 120° C. to −56.5° C. This method additionally involves a compression with pure loss of the nitrogen up to 5.2 bar.

The refrigerating device uses a cooling principle, known in itself, called integrated cascaded. However, the refrigerating device according to the present invention has specific technical traits that will be described below. In fact, for cooling the fumes, over a significant temperature variation ranging from ambient temperature to −90° C., by means of a refrigerating apparatus that is simple to produce, only comprising a single compressor, the method according to the present invention uses a mixture of refrigerant fluids. The refrigerating apparatus according to the present invention comprises a single compressor, two intermediate evaporation condensers and two parallel, low-temperature anti-sublimation evaporators described above. The intermediate evaporation condensers make possible both the distillation of the mixture of refrigerant fluids and the progressive cooling of the flow of fumes.

Depending on the climatic conditions and the content of trace components the residual water vapor contained in the fumes is condensed either completely, or partially, in the air or water cooling exchanger described above. If this is not the case, the water is condensed complementarily in the first exchanger of the refrigerating apparatus, in which the temperature is slightly higher than 0° C. and in which the retention time is sufficient to permit this condensation.

The mixtures of refrigerant fluids, making it possible to carry out a cycle, may be mixtures of three, four or five components. The mixtures described integrate the constraints of the Montreal Protocol, which bans the production and, in the end, the use of refrigerant gases containing chlorine. This implies that no CFC (chlorofluorocarbon), nor H—CFC (hydrochlorofluorocarbon) is contained in the usable components, although several of these fluids may be functionally absolutely favorable to be used as working fluids in an integrated cascade. The Kyoto Protocol also imposes constraints on gases with a high Global Warming Potential (GWP). Even if they are not banned at the current time fluids whose GWP is as low as possible are preferably used according to the present invention. The mixtures that can be used in the integrated cascade according to the present invention, to carry out the capture of the $CO_2$ in the fumes, are indicated below.

Three-component mixtures

The three-component mixtures may be mixtures of methane/$CO_2$/R-152a, i.e., by adopting the standardized nomenclature (ISO 817) for refrigerant fluids, R-50/R-744/R-152a mixtures. It is possible to replace the R-152a with butane R-600 or isobutane R-600a.

Four-component mixtures

The four-component mixtures may be mixtures:
of R-50/R-170/R-744/R-152a, or
of R-50/R-170/R-744/R-600, or
of R-50/R-170/R-744/R-600a.

The R-50 may also be replaced with R-14 but its GWP is very high (6,500 kg equivalent of $CO_2$).

Five-component mixtures

The five-component mixtures may be produced by selecting five of these components from the list of the following eight fluids: R-740, R-50, R-14, R-170, R-744, R-600, R-600a, R-152a in suitable ratios with progressively multistage critical temperatures, these critical temperatures being shown in Table 2. The following mixtures may be mentioned as examples:
R-50/R-14/R-170/R-744/R-600, or
R-740/R-14/R-170/R-744/R-600, or
R-740/R-14/R-170/R-744/R-600a, or
R-740/R-14/R-170/R-744/R-152a, or
R-740/R-50/R-170/R-744/R-152a, R-740 being argon.

Table 2 shows the principal thermochemical characteristics and the names of these fluids.

TABLE 2

| Body Chemical and standardized name (ISO 817) | Chemical formula | Critical temperature (° C.) | Critical pressure (bar) | Molar mass (g/mole) |
|---|---|---|---|---|
| R-740 Argon | A | −122.43 | 48.64 | 9.94 |
| R-50 Methane | $CH_4$ | −82.4 | 46.4 | 6.04 |
| R-14 Tetrafluoromethane | $CF_4$ | −45.5 | 37.4 | 8.01 |
| R-744 Carbon dioxide | $O_2$ [sic, $CO_2$] | 1.01 | 3.77 | 4.01 |
| R-170 Ethane | $_2H_6$ [sic, $C_2H_6$] | 2.2 | 8.9 | 0.06 |

TABLE 2-continued

| Body Chemical and standardized name (ISO 817) | Chemical formula | Critical temperature (°C.) | Critical pressure (bar) | Molar mass (g/mole) |
|---|---|---|---|---|
| R-152a Difluoroethane | $HF_2$—$CH_3$ | 13.5 | 4.9 | 6.05 |
| R-600a Isobutane or 2-methylpropane | $(CH_3)_3CH$ [sic] | 35 | 6.47 | 8.12 |
| R-600 n-Butane | $H_4H_{10}$[sic, $C_4H_{10}$] | 52 | 7.97 | 8.12 |

The two intermediate evaporation condensers and the anti-sublimation evaporators comprise the three temperature stages of the integrated cascade. These three stages all function at the same pressure because they are all connected to the suction of the compressor, but the mean temperatures in these three stages are typically about −5° C., −30° C. and −90° C. because there must be a temperature variation between the flow of refrigerants circulating in the other pipeline of each of the exchangers.

The flows of the refrigerant fluid mixture in the three "stages" of the integrated cascade depends on the ratio of the components in the mixtures of refrigerant fluids. Therefore, there is a link between composition and temperature levels of the cascade.

The data below, provided as an example, pertain to an integrated, cascaded refrigerating apparatus using a five-component mixture of refrigerant fluids, whose mass composition is as follows:

R-50 1%
R-14 3%
R-170 19%
R-744 27%
R-600 50%.

The ratio between flammable and non-flammable components is such that the mixture is a mixture of non-flammable safety. The critical temperature of this mixture is 74.2° C. and its critical pressure is 50 bar.

The percentages of the components, whose critical temperature is the highest, here R-600 and R-744, are the majority in the mixture because their evaporation in the two intermediate stages makes it possible to carry out the distillation of the components with low critical temperature. The components with low critical temperature may then evaporate at low temperature in the anti-sublimation evaporator, which is a dual evaporator, alternately operating on one or the other of its parallel pipelines.

Preferably, the exchangers in the cascade are countercurrent exchangers. They make it possible to use the three great temperature variations between the inlets and the outlets. They also make possible the heat recoveries between liquid and vapor phases at different temperatures.

The anhydrous fume flow, $M_{N2+CO2}$, after passing through the anti-sublimation evaporator, is reduced to the nitrogen flow, $M_{N2}$, which represents 0.719 of the initial flow M. This nitrogen flow, whose temperature is −90° C., circulates countercurrent to the tube of fumes in order to participate in the cooling of the anhydrous fume flow $M_{N2+CO2}$, and then the total fume flow M. The participation of the nitrogen flow leaving the anti-sublimation evaporator in the cooling of the fumes takes place until the temperature of the nitrogen has risen to ambient temperature. The pressure of the nitrogen flow $M_{N2}$ is equal to 73% of the initial pressure of the flow M, considering the successive captures of water vapor and $CO_2$ vapors. The overpressure necessary for circulation is created, e.g., by an air compressor, whose flow injected in a venturi tube makes it possible to extract the nitrogen flow.

Another design consists of compressing the total flow leaving the air cooling exchanger in order to make possible a slight overpressure compared to atmospheric pressure along the entire fume circulation circuit and until its discharge to the air.

BRIEF DESCRIPTION OF THE DRAWINGS

FIG. 3 shows the apparatus for capturing carbon dioxide by anti-sublimation.

DETAILED DESCRIPTION OF THE METHOD AND SYSTEM ACCORDING TO THE PRESENT INVENTION

Figure 1:
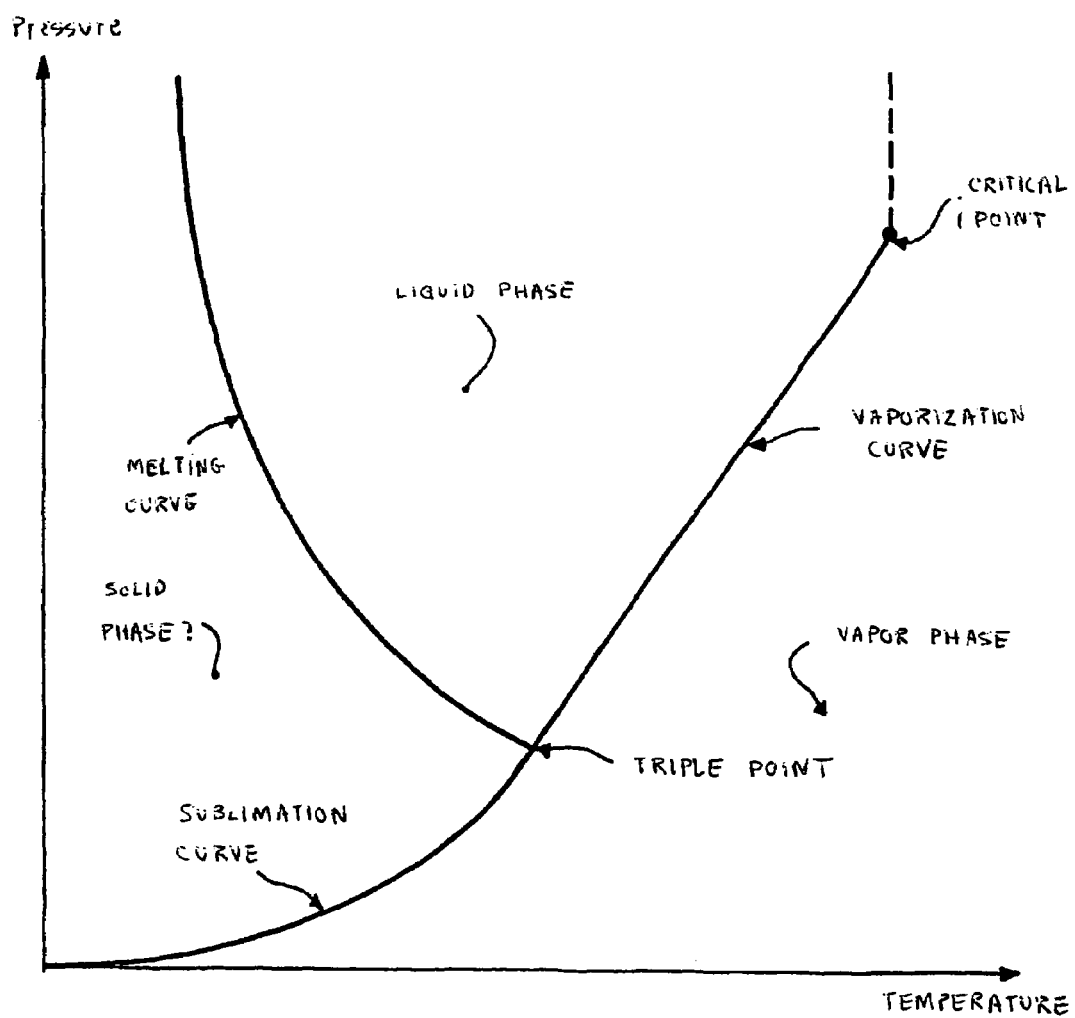
FIG. 1 shows a phase diagram.

Other features and advantages of the present invention shall become evident from reading the description of an embodiment variant of the present invention, which is given as an indicative and nonlimiting example, and of FIG. 3, which shows a schematic view of an embodiment variant of a system making it possible to capture carbon dioxide by anti-sublimation.

FIG. 3 will be described now. The numerical references are those of FIG. 3.

The table below specifies the system of numerical references used. It explains the meaning of identical technical terms having different numerical references.

Nomenclature of the numerical references of FIG. 3

| Nominal group | References |
|---|---|
| Heat engine | 1 |
| Outlet pipeline of the heat engine | 2 |
| Cooling system of the heat engine | 3 |
| Energy recovery circuit of the engine | 4 |
| Thermal energy recovery exchanger of the engine | 5 |
| First exchanger for cooling fumes | 6 |
| Turbine | 7 |
| Air condenser | 8 |
| Pump | 9 |
| Alternator | 10 |
| Exchanger for cooling fumes | 11 |
| Cooling system | 12 |
| Fume outlet pipeline of the exchanger 11 | 13 |
| Pipeline for discharge of the condensate | 14 |
| Water discharge pipeline of the first (No. 1) fume cooler evaporator | 15 |
| Water collector reservoir | 16 |
| Refrigerating compressor | 17 |
| Partial condenser | 18 |
| Cooling system of the refrigerating condenser | 19 |
| Pipeline | 20 |
| Pipeline | 21 |
| Evaporation condenser No. 1 | 22 |
| Pipeline | 23 |
| Pressure reducing valve | 24 |
| First (No. 1) fume cooler evaporator | 25 |
| Liquid-vapor exchanger No. 1 | 26 |
| Pipeline | 27 |
| Separator reservoir | 28 |
| Gas outlet pipeline | 29 |
| Pipeline | 30 |
| Pressure reducing valve | 31 |
| Evaporation condenser No. 2 | 32 |

-continued

| Nominal group | References |
|---|---|
| Fume cooler evaporator No. 2 | 33 |
| Liquid-vapor exchanger No. 2 | 34 |
| Pipeline | 36 |
| Three-way valve | 37 |
| Pipeline | 38 |
| Anti-sublimation evaporators No. 1 | 39 |
| Anti-sublimation evaporators No. 2 | 40 |
| Pressure reducing valve No. 1 | 41 |
| Pressure reducing valve No. 2 | 42 |
| Pipeline | 43 |
| Pipeline | 44 |
| Gas return pipeline | 45 |
| Three-way valve | 46 |
| Three-way valve | 47 |
| Pump | 48 |
| Storage reservoir | 49 |
| Pump | 50 |
| Removable reservoir | 51 |
| Valve | 52 |
| Three-way valve | 53 |
| Three-way valve | 54 |
| Pipeline for discharging nitrogen to the air | 55 |
| Dehydrator | 56 |
| Air compressor | 57 |
| Pipeline | 58 |
| Venturi tube | 59 |

The thermal changes of the fumes and their chemical composition were followed as they circulate in the circuit in which they are cooled.

The flow M of the fumes is the sum of four flows:

$$M = m_{H2O} + m_{CO2} + m_{N2} + m_{traces},$$

where $m_{H2O}$ designates the flow of water vapor,
where $m_{CO2}$ designates the flow of carbon dioxide,
where $m_{N2}$ designates the flow of nitrogen,
where $m_{traces}$ designates the flow of trace gases.

The fumes exit from the heat engine 1 (from the internal combustion engine) via the pipeline 2 (outlet pipeline of the heat engine). Their temperature is 900° C. The energy that will be ceded by the fumes in the exchanger 6 (first exchanger for cooling the fumes) can be expressed as a function of the flow of fumes M:

$$Q_{ech} = M (h_{s6} - h_{e6})$$

where $h_{s6}$, $h_{e6}$ designate the enthalpies of the fumes at the outlet and at the inlet of the exchanger 6, respectively.

The mass compositions of the fumes at the outlet of the heat engine 1 are equal to:
$CO_2$: 19.5%,
$H_2O$: 8.6%,
$N_2$: 71.9%, respectively.

In the present description, the trace gases were disregarded.

The energy $Q_{ech}$ ceded by the fumes in the exchanger 6 is about equal to 1,000 kJ/kg. The temperature of the fumes at the outlet of the exchanger 6 is 50° C. It is possible to express the power $P_{ech}$ ceded (expressed in kW) as a function of the flow of fumes M expressed in kg/sec.:

$$P_{ech} = Q_{ech} \times M = 1{,}000 \text{ kJ/kg} \times M \text{ kg/s} = 1{,}000\, M \text{ in kW}.$$

The thermal energy ceded by the fumes in the exchanger 6 is converted in a manner known in itself into mechanical energy, then into electric energy. The fumes cede their energy to the water circulating in the exchanger 6. This water is successively reheated in the liquid phase from 42° C. to 310° C., then brought to a boil at the saturation pressure at 310° C., i.e., at 99 bar (or 340° C. and 145 bar, second embodiment variant of the exchanger 6) and finally this water is overheated up to 400° C. (or 500° C., second embodiment variant of the exchanger 6). The overheated vapor is released into a turbine 7, which, in the variant described, drives an alternator 10. The released vapors, which are partially diphasic after this release, are condensed by a condenser 8 (air condenser). The liquid thus formed is compressed by a pump 9 at the pressure of 99 bar (at 145 bar, in the case of the second embodiment variant). Optionally, thermal energy (not counted in the energy balances described) can be recovered from the cooling system 3 of the heat engine 1. For this purpose, the exchanger for recovering 5 energy from the cooling system 3 of the heat engine 1 comprises a recovery circuit 4. The connections between the recovery circuit 4 and the cooling system 3 of the heat engine 1 are not shown. In summer, the condensation temperature is 40° C. in the air condenser 8. The condensation temperature may typically vary from 10° C. to 65° C., between winter and summer in the hottest countries. The recoverable energy in the case of a vapor condensation temperature equal to 10° C. is greater than that recovered in the case of a condensation temperature equal to 65° C.

Tables 3 and 4 mention, in the case of each embodiment variant, the enthalpies of the liquid water and of water vapor:
at the inlet and at the outlet of the exchanger 6,
at the outlet of the turbine 7, and
at the outlet of the air condenser 8.

These four enthalpy values are representative of the energy output of the energy recovery circuit. The exchanger 6, the turbine 7, the condenser 8 and the pump 9 are connected by pipelines and make up the circuit for recovering thermal energy from the fumes. The thermal energy thus recovered is converted into mechanical energy.

An alternator 10 coupled to the turbine 7 makes it possible to convert the mechanical energy into electric energy.

TABLE 3

| | Temperature (° C.) | Pressure (bar) | H (enthalpy) (kJ/kg) | S (entropy) (kJ/kg · K) |
|---|---|---|---|---|
| Inlet of the exchanger 6 | 42.4 | 99 | 177.4 | |
| Outlet of the exchanger 6 | 400 | 99 | 3098.2 | 6.2183 |
| Outlet of the turbine 7 | 40 | 0.074 | 1935.9 | 6.2183 |
| Outlet of the condenser 8 | 40 | 0.074 | 167.4 | |

TABLE 4

| Locations | Temperature (° C.) | Pressure (bar) | H (enthalpy) (kJ/kg) | S (entropy) (kJ/kg · K) |
|---|---|---|---|---|
| Inlet of the exchanger 6 | 43.5 | 145 | 182 | |
| Outlet of the exchanger 6 | 500 | 145 | 3314.8 | 6.3659 |
| Outlet of the turbine 7 | 40 | 0.074 | 1982.1 | 6.3659 |
| Outlet of the condenser 8 | 40 | 0.074 | 167.4 | |

The fumes circulate in the exchanger 6 countercurrent to the flow of water. The temperature of the fumes ranges from 900° C. to 50° C., while the temperature of the water ranges from 40° C. up to 400° C. in the first variant and up to 500° C. in the second variant. In the case of the first variant, the vaporization takes place at 310° C., under a pressure of 99 bar. In the case of the second [variant], the vaporization takes place at 340° C., under a pressure of 145 bar. The exchanger 6 is therefore both a water reheater and a boiler.

In the case of the first variant, when the temperature at the outlet of the exchanger 6 is equal to 400° C., when the pressure at the inlet of the exchanger 6 is equal to 99 bar and when the condensation temperature is equal to 40° C., Table No. 3 makes it possible to determine the mechanical energy, expressed as unit mass flow of water in the circuit of the exchanger 6. For a mechanical output of the turbine 7 of 0.85, the mechanical energy is equal to:

(3098.2−1935.9)×0.85=988 kJ/kg.

In the case of the second variant, when the temperature at the outlet of the exchanger 6 is equal to 500° C., when the pressure at the inlet of the exchanger 6 is equal to 145 bar and when the condensation temperature is equal to 40° C., Table No. 4 makes it possible to determine the mechanical energy, expressed as unit mass flow of water in the circuit of the exchanger 6. For a mechanical output of the turbine 7 of 0.85, the mechanical energy is equal to:

(3314.8−1982.1)×0.85=1132.8 kJ/kg.

In the case of the first variant, the energy provided by the circuit of fumes to the exchanger 6 is equal to:

$Q_{ech}$=3098.2−177.4=2920.8 kJ/kg.

In the case of the second variant, the energy provided by the circuit of fumes to the exchanger 6 is equal to:

$Q_{ech}$=3314.8−182=3132.8 kJ/kg.

It was stated above that the thermal power $P_{ech}$ ceded by the fumes in the exchanger 6, as a function of the flow of fumes, is equal to:

$P_{ech}$=1000 M, expressed in kW.

The extracted mechanical power is expressed as a function of the fume flow from the output of the cycle of the turbine:

The extracted mechanical energy, referred to this flow M, amounts to expressing the output of the cycle of the turbine as a function of this flow of fumes, i.e.:

in case 1: $P_{meca}$=(988/2920.8)×1000×M=338.3 M in kW in case 2: $P_{meca}$=(1132.8/3132.8)×1000×M=361.6 M in kW In the case of the first and second embodiment variants, the alternator 10 has an output of 0.9. The electric power $P_{elec}$ obtained thanks to the circuit for recovering thermal energy from the fumes is:

in the case of the first embodiment variant equal to: $P_{elec}$=304.5 M in kW in the case of the second embodiment variant equal to: $P_{elec}$=325.4 M in kW.

It is therefore possible to recover between 30.5% and 32.5% of the electric energy from the fumes, once their temperature is above 400° C.

The successive phases of cooling the fumes in the different exchangers will be described now. The cooling is a pure cooling for the nitrogen, a cooling and a condensation for the water, a cooling and an anti-sublimation for the $CO_2$. To understand where the liquid water and the solid, then liquid $CO_2$ are extracted, it is necessary to follow both the variations of the mass flows of these three components and the energy variations along the circuit for cooling the fumes, i.e., along the pipeline 13. The energy variations are expressed for each of the components in kJ/kg and are additive quantities, as well as mass fractions. The enthalpies of $CO_2$ are reported in Table 5 and on FIG. 2, which shows, in a manner known per se, a temperature-entropy diagram of $CO_2$. On this diagram, the temperatures are expressed in Kelvin the entropies are expressed in kJ/kg.K.

Point A is a point representative of $CO_2$ at the inlet of the first (No. 1) cooler evaporator 25. The pressure is 1 bar, the temperature is 50° C. (323 K), the enthalpy of the $CO_2$ is 450.8 kJ/kg (see Table 5).

Point B is a point representative of the state of the $CO_2$ at the outlet of the exchanger 11, the temperature is 40° C., the enthalpy is reported in Table 5.

Point C is a point representative of the $CO_2$ at the inlet [sic, "entée" is a typo for "entrée"—Tr.Ed.] of the anti-sublimation evaporator (No. 1) 39, before the gas/solid phase change.

Point D is a point representative of $CO_2$ on the complete $CO_2$ solidification curve at −80° C. The solidification takes place on the wall of the tube of the anti-sublimation evaporator (No. 1) 39. The complete gas/solid phase change required a cooling energy of 568 kJ/kg.

Point E is a point representative of the $CO_2$ during the defrosting operation by sublimation of the solid $CO_2$ in the chamber of the anti-sublimation evaporator (No. 2) 40. This operation leads to a rise in the pressure by partial sublimation of the solid $CO_2$, which increases the vapor pressure up to 5.2 bar.

Point F is a point representative of $CO_2$, after the melting of the $CO_2$, at a constant pressure [of] 5.2 bar. The $CO_2$ is therefore entirely liquid at point F.

TABLE 5

| Points | Pressure (bar) | Temperature (° C.) (K) | Enthalpy (kJ/kg) |
| --- | --- | --- | --- |
| A | 1 | 50 (323K) | 450.8 |
| B | 1 | 40 (313K) | 442 |
| C | 0.85 | −72 (201K) | 349 |
| D | 0.85 | −80 (193K) | −228 |
| E | 5.2 | −56.5 (216.6K) | −190 |
| F | 5.2 | −56.5 (216.6K) | 0 |

The energy balances using the values of Table 5 are described below.

The description of the change in the flow of fumes at the inlet of the exchanger for cooling the fumes 11 will now be continued, and the mechanism for capturing the water vapor as well as the consumption of energy that is associated therewith will be explained.

Table 6 shows the variations of temperatures, enthalpies and mass fractions at the inlets [sic, and—Tr.Ed.] outlets of the exchangers and pipeline sections connecting them. Likewise, [it shows] the variation of the flow as a function of the successive captures of the water vapors, then of $CO_2$, indicating the quantity of energy extracted from each exchanger. The pipeline 13 of the fumes and the pipeline 55 for discharging nitrogen to the air are arranged in close contact and they are heat-insulated from the outside. The sections of the pipelines 13 and 55 located between the components 11, 25, 33, 39 and 40 constitute the successive exchangers.

TABLE 6

| Exchangers | Inlets Outlets | T (° C.) | Flow of fumes | Mass fraction, CO$_2$ | Mass fraction, H$_2$O | (hs - he) J/kg Energy of the different exchanges |
|---|---|---|---|---|---|---|
| Exchanger 11 | E 11 | 50 | M | 0.195 | 0.086 | 109 |
|  | S 11 | 40 | 0.964 M |  | 0.05 |  |
| Pipeline 55 between 25 and 11 | 25 11 | 1 40 | 0.719 M | 0.195 |  | 26.3 |
| Exchanger 25 | E 25 | 36.5 | 0.956 M | 0.195 | 0.042 | 138 |
|  | S 25 | 1 | 0.914 M |  | 0 |  |
| Pipeline 55 between 33 and 25 | 33 25 | −20 1 | 0.719 M | 0.195 |  | 14 |
| Exchanger 33 | E 33 | −14 | 0.914 M | 0.195 | 0 | 5.4 |
|  | S 33 | −20 | 0.914 M |  | 0 |  |
| Pipelines 55 between 39 or 40 and 33 | 39 or 40 33 | −90 −20 | 0.719 M |  |  | 7 |
| Evaporator 39 or 40 | E 39 (40) | −72 | 0.914 M | 0.195 | 0 | 25.9 |
|  | CO$_2$ frost | −80 | 0.719 M | 0 | 0 |  |
|  | S 39 (40) | −90 | 0.719 M | 0 | 0 |  |

The cooling of the fumes in the exchanger 11 from 50 to 40° C. with partial condensation of the water requires a power of 109 M (kW); in the example dealt with, the water starts to condense in this fume cooling exchanger 11. Because of other temperature conditions or due to the presence of trace compounds which change the dew point of the water, the condensation of the water may start in the exchanger 6. In fact, the water dew point is close to 50° C. for a water mass concentration in the fumes of 8.6%. The flow of fumes at the outlet of the exchanger 11 is equal to 0.964 M. The mass fraction of the water decreases from 8.6% to 5%. The exchanger 11 is designed to permit a discharge of the water condensate via the pipeline 14. The pipeline 14 connects the exchanger 11 to the water collector reservoir 16.

The fumes in the pipeline 13 are cooled by the pipeline 55 of the outlet of the exchanger 11 up to the inlet of the exchanger 25. These sections of pipelines are additionally heat-insulated from the outside.

Let's specify the mode of exchange between the two pipelines 13 and 55; they are in heat-efficient contact for each connecting section that makes up the pipeline 13 between the exchangers 11, 25, 33 and 39 or 40. These three sections constitute real exchangers, in which the cooler of the nitrogen flow in the pipeline 55 cools the flow of fumes that circulate countercurrent in the pipeline 13. Table 6 indicates the variation of enthalpy of the nitrogen flow in the pipeline 55 for each of the three sections between the exchangers 39 or 40 and the exchanger 33, then between the exchanger 33 and the exchanger 25 and finally between the exchanger 25 and the exchanger 11. The enthalpy variation of the nitrogen flow of 0.719 M (kg/sec.) is transmitted with an exchange efficiency of 90% to the flow of fumes circulating in the pipeline 13 on each of the three sections of exchangers specified. The energy ceded by the nitrogen flow between the exchangers 11 and 25 is 26.3 M (kW). It is used both to condense a part of the water vapor, which is reduced to 4.2%, and to cool the flow of fumes to 36.5° C. at the inlet of the exchanger 25.

At the outlet of the exchanger 25, the flow of fumes is at a temperature of 1° C., which requires a refrigerating power of 138 M (kW) in the exchanger 25 to make possible such a lowering of the temperature of the fumes and the condensation of the remaining water vapor.

The temperature of the fumes is regulated at 1° C. to prevent the crystallization of the water contained in the fumes. The section and the design of the first (No. 1) cooler evaporator 25 make it possible to ensure an extensive dehumidification of the flow of fumes. Typically, less than 0.05% water remains in the mass in the fumes at the outlet of the first (No. 1) cooler evaporator 25.

The fume pipeline 13 is in communication with the internal chamber of the first (No. 1) cooler evaporator 25. The water extracted from the fumes during its passage in the first (No. 1) cooler evaporator 25 is recovered in the internal chamber. It is then transferred to the water collector reservoir 16 by the water discharge pipeline 15 of the first (No. 1) cooler evaporator 25. The fumes leaving the first (No. 1) cooler evaporator 25 pass into a dehydrator 56, which ensures the complete drying of the fumes. The anhydrous mass flow of the fumes, noted as $M_{N2+CO2}$, is equal to 0.914 of the flow M exiting from the heat engine 1. In fact, 8.6% of the mass flow was captured in the form of liquid water in the fume cooling exchanger 11, in the exchanger consisting of the sections of the pipelines 13 and 55 in contact, in the first (No. 1) cooler evaporator 25 and in the dehydrator 56.

The flow of nitrogen circulating in the pipeline 55 provides a refrigerating power of 14 M (kW) to the section of pipeline 13 that connects the exchanger 25 to 33 and cools the residual flow of nitrogen and CO$_2$ fumes $M_{N2+CO2}$ to a temperature of −14° C. at the inlet of the exchanger 33.

In the second (No. 2) cooler evaporator 33, a refrigerating power of 5.4 M is provided and the residual flow of nitrogen and CO$_2$ $M_{N2+CO2}$ is cooled to a temperature of −20° C.

Taking into account the cooling between the pipelines 13 and 55, the residual flow $M_{N2+CO2}$ penetrates into one of the two anti-sublimation evaporators (No. 1) 39 or (No. 2) 40 at a temperature of about −72° C. because the pipeline 55 provided a refrigerating power of 47 M (kW).

The shape and design of the two anti-sublimation evaporators (No. 1) 39 or (No. 2) 40 make possible a long retention time of the gases. The residual flow of fumes $M_{N2+CO2}$ is cooled until the anti-sublimation of CO$_2$, which requires a refrigerating power of 125.9 M (in kW). The CO$_2$ is then captured by anti-sublimation at a temperature of about −80° C. at the pressure of 0.85 absolute bar or about −78.6° C. at the pressure of one bar in the anti-sublimation evaporator 39 or 40, while the residual nitrogen flow noted as $M_{N2}$ is cooled to −90° C. and then is routed to the atmosphere through the pipeline 55 which exchanges countercurrent to the pipeline 13.

Figure 2:
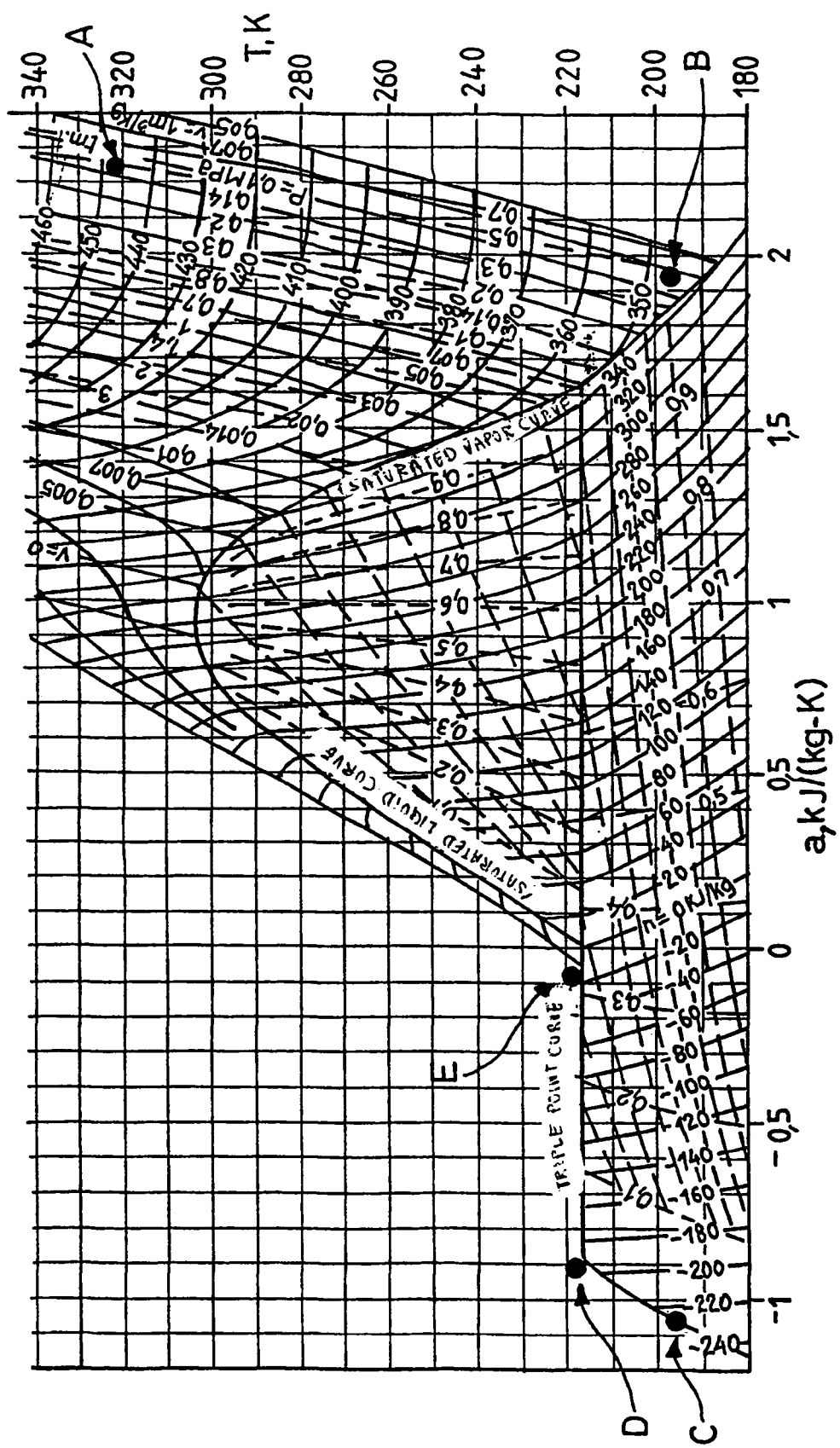
FIG. 2 shows a temperature-entropy diagram for carbon dioxide.

The energy change of the CO$_2$ in the anti-sublimation evaporator (No. 1) 39 is explained in detail, where it returns to a temperature of about −72° C. and an enthalpy of 349 kJ/kg (point C, Table 5 and FIG. 2). The complete vapor phase-solid change (anti-sublimation) takes place on the tube of the anti-sublimation evaporator (No. 1) 39, the CO$_2$ progresses to point D (Table 5 and FIG. 2), its enthalpy is −228 kJ/kg.

The refrigerating power, expressed in kW, as a function of the flow of fumes, is (349−(−228))×0.195 M=112.5 M.

Before release into the pressure reducing valve (No. 1) 41, the refrigerant fluid passes in the anti-sublimation evaporator (No. 2) 40, which is in the defrosting phase. The refrigerant fluid then recovers the melting energy from the CO$_2$. The recoverable energy corresponds, on the diagram of FIG. 2, to the passage from point D (solid CO$_2$ at 0.85 bar)

to point F (liquid $CO_2$ at 5.2 bar). The gross enthalpy variation is 228 kJ/kg. In the case of the embodiment variant described, the transfer efficiency of the exchangers is 90%. Consequently, the energy recovered is equal to 205 kJ/kg. The refrigerating power recovered as a function of the total flow M of fumes is 40 M, expressed in kW:

205×0.195 M=40 M.

Considering the recovery of energy from the defrosting of the $CO_2$ by the liquid refrigerant fluid, the anti-sublimation of $CO_2$ at an evaporation temperature of −90° C. (a variation of about 10° C. is necessary between the refrigerant fluid and the vapor or solid $CO_2$ for icing the $CO_2$) only requires a refrigerating power of:

(112.5−40)M=72.5 M (expressed in kW)

It was seen that the electric powers (expressed in kW) that can be recovered in the case of the two embodiment variants described above are equal to 304.5 M and 325.4 M, respectively. They are greater than the compression electric power that the compressor must supply to produce the refrigerating power. In fact, expressed in kW as a function of the fume flow M, the compression electric power is about 187 M.

This energy balance can be validated by proceeding with a theoretical estimation of the compression electric power that the compressor must supply to produce the refrigerating power. To proceed with this estimation, it is first necessary to recall what is defined as the performance coefficient of a refrigerating machine. The performance coefficient is the ratio of the refrigerating power $P_{frig}$ to the electric power supplied by the compressor unit $P_{elec.\_comp*}$:

$COP = P_{frig}/P_{elec.\_comp*}$.

Considering the fact that the refrigerating powers will be changed at different temperature levels: −5° C., −30° C., −90° C., it is indispensable to use a typical law of variation of the performance coefficient as a function of the temperature.

The simplest way to express this law is to express it as a function of Carnot's performance coefficient. Carnot's performance coefficient represents the ideal performance of the refrigerating machines and is simply calculated as a function of the condensation temperature (Tcond) and evaporation temperature (Tevap) according to the formula:

$COP_{Carnot} = Tevap/(Tcond−Tevap)$ the temperatures being expressed in Kelvin.

A law based on the analysis of the actual machines can be expressed by:

$COP = (2.15 \times 10^{-3} T + 0.025) COP_{Carnot}$

Table 7 below shows the COP according to the evaporation temperatures.

TABLE 7

| T (° C.) | T (K) | (2.15 × 10⁻³ T + 0.025) | COP Carnot | COP |
| --- | --- | --- | --- | --- |
| −90 | 183 | 0.42 | 1.4 | 0.59 |
| −60 | 213 | 0.48 | 2.13 | 1.02 |
| −40 | 233 | 0.525 | 2.91 | 1.53 |
| −30 | 243 | 0.547 | 3.47 | 1.9 |
| −5 | 268 | 0.6 | 5.95 | 3.57 |

This table makes it possible to calculate the electric power consumed by the compressor according to the temperature level at which the refrigerating power is supplied. The performance coefficients make it possible to calculate the power consumed by the compressor for supplying the refrigerating power (to the different exchangers).

The refrigerating power supplied to the exchanger 25 to cool the fumes to 0° C. is supplied at −5° C. As the refrigerating power to be supplied is equal to 138 M (Table 6) and as the performance coefficient is 3.57 (Table 7), the electric power consumed by the compressor is equal to: 138 M/3.57=38.6 M in kW.

The refrigerating power supplied to the second evaporator 33 for cooling fumes is supplied at −30° C. As the refrigerating power to be supplied is equal to 5.4 M (Table 6) and as the performance coefficient is 1.9 (Table 7), the electric power consumed by the compressor is equal to: 5.4/1.9=2.8 M in kW.

The refrigerating power supplied to the anti-sublimation evaporators (No. 1) 39 or (No. 2) 40 is supplied at −90° C. As the refrigerating power is 125.9 M−40 M=85.9 M and as the performance coefficient is 0.59 (Table 7), the electric power consumed by the compressor is equal to: 85.9 M/0.59=145.6 M in kW.

The refrigerating power necessary for cooling the nitrogen from 50 to −90° C. was taken into account in the calculations of each exchanger.

The total compression electric power ($P_{comp}$) is therefore to be supplied only for evaporators 25, 33 and 39 or 40 and is therefore equal to:

$P_{comp}$=38.6+2.8+145.6=187 M in kW, as well as what was mentioned above.

The electric power consumed by the refrigerating compressor as a function of the fume flow M is therefore 187 M in kW. This power is to be compared to the electric power recovered from the fume flow, which is variable between 304.5 M and 325.4 M. The electric power of the compressor therefore represents about 60% of the electric energy recoverable by the water vapor recovery cycle described above.

Referring again to FIG. 3, the operation of the refrigerating apparatus, operating in an integrated cascade, will now be specified. The refrigerating compressor 17 suctions the vapor phase mass flow from one of the multicomponent refrigerant mixtures defined above. More particularly, in the case of the embodiment variant that will be described below, the mixture is composed of five components, whose mass percentages are as follows:

R-50 (1%)
R-14 (3%)
R-170 (19%)
R-744 (27%)
R-600 (50%).

The suction pressure is 1.7 bar. The condensation pressure, for a condensate outlet temperature of 40° C., is 22 bar. The partial refrigerating condenser 18 is cooled by a cooling system 19 (the cooling system of the partial refrigerating condenser). Water or air circulates in the cooling system 19.

The partial refrigerating condenser 18 is a separator of liquid and gaseous phases of the total entering refrigerant flow (designated below as Mf). The gas phase flow (designated below as Mtête1) exits at the top (at the head) of the partial refrigerating condenser 18 by the pipeline 20. The liquid flow (designated below as Mpied1) exits at the bottom (at the foot) by the pipeline 21. The liquids are drained at the bottom of the partial refrigerating condenser 18 as a result of gravity.

The liquid flow (Mpied1) is subcooled in the liquid-vapor exchanger (No. 1) 26. This flow (Mpied1) is equal to about 50% of the total refrigerant flow (Mf). The liquid flow (Mpied1) is rich in the heaviest components, i.e., here R-600 and R-744, and is released in the pressure reducing valve 24 at the evaporation pressure of 1.7 bar. The liquid flow (Mpied1) released evaporates successively in the first (No. 1) evaporation condenser 22 and then in the first (No. 1) fume cooler evaporator 25, in which the evaporation is achieved. The fluid flow (Mpied1) thus entirely vaporized will cede its coolness in the liquid-vapor exchanger (No. 1) 26 and then rejoin the suction collector of the compressor 17 via the pipeline 27.

The gaseous flow (Mtête1), exiting at the top of the partial condenser 18, represents the other 50% of the total refrigerant flow (Mf). The gaseous flow (Mtête1) will be partially condensed in the first (No. 1) evaporation condenser 22. This flow (Mtête1), having become diphasic (liquid-vapor) at the outlet of the first (No. 1) evaporation condenser 22, will be separated into independent liquid and vapor phases in the separator reservoir 28. The vapor phase flow (Mtête2) exits at the top of the separator reservoir 28 via the pipeline 29. The liquid flow (Mpied2) exits at the bottom of the separator reservoir 28. The gaseous flow (Mtête1) exiting at the top of the partial condenser 18 was then separated into two flows: a gaseous flow (Mtête2) representing 40% of the entering flow (Mtête1) and a liquid flow (Mpied2) representing 60% of the entering flow (Mtête1). The gaseous phase flow (Mtête2) exiting from the separator reservoir 28 via the pipeline 29 will be entirely condensed in the second (No. 2) evaporation condenser 32. The entirely liquid flow (Mtête2) is alternately evaporated in the anti-sublimation evaporators (No. 1) 39 or (No. 2) 40.

The condensation, in the second (No. 2) evaporation condenser 32, of the gaseous phase flow (Mtête2) exiting from the separator reservoir 28 was carried out by the partial evaporation of the liquid flow (Mpied2) exiting at the bottom of the separator reservoir 28 and after this liquid flow (Mpied2) has been released into the pressure reducing valve 31. The liquid flow (Mpied2) achieves its evaporation in the fume cooler evaporator 33. The entirely vaporized liquid flow (Mpied2) cedes its coolness in the second (No. 2) liquid-vapor exchanger 34 and then rejoins the suction collector of the compressor 17 via the pipeline 35.

The liquid flow (Mtête2) passes through the first (No. 1) three-way valve 37. This valve is open on the pipeline 38 and therefore closed on the pipeline 44. The liquid flow (Mtête2) is sub-cooled in the second anti-sublimation evaporator (No. 2) 40, which thus serves as exchanger for subcooling during its $CO_2$ defrosting phase. The liquid flow (Mtête2), subcooled, is then released into the first (No. 1) pressure reducing valve 41. It is then evaporated in the first (No. 1) anti-sublimation evaporator 39.

The flow of refrigerant vapors (Mtête2) exiting from the first (No. 1) anti-sublimation evaporator 39 passes through the second (No. 2) three-way valve 46 and returns to the refrigerating compressor 17 via the gas return pipeline 45. This flow (Mtête2) represents about 20% of the total refrigerant flow (Mf) suctioned by the refrigerating compressor 17.

When the operation of the first (No. 1) anti-sublimation evaporator 39 is alternated with that of the second (No. 2) anti-sublimation evaporator 40, the first (No. 1) three-way valve 37 switches, via the pipeline 44, the circulation of the liquid refrigerant fluid to the first (No. 1) anti-sublimation evaporator 39, in which it is subcooled. The refrigerant fluid is then released into the pressure reducing valve (No. 2) 42. It is then evaporated in the second (No. 2) anti-sublimation evaporator 40 and then returns, via the second (No. 2) three-way valve 46 and the pipeline 45, to the refrigerating compressor 17.

The circulation of the refrigerant fluid in the two anti-sublimation evaporators 39 and 40 will now be described. These anti-sublimation evaporators operate alternately. If one is actively an evaporator, the other is a subcooling exchanger and vice-versa. If the evaporation is carried out in the first (No. 1) anti-sublimation evaporator 39, the first (No. 1) three-way valve 37 is open, the refrigerant mixture may circulate in the pipeline 38 but may not circulate in the pipeline 44.

The mixture of liquid refrigerant (Mtête2), after being released into the pressure reducing valve (No. 1) 41, is evaporated in the first (No. 1) anti-sublimation evaporator 39 at a temperature starting from about −100° C. to a temperature of about −70° C. at the end.

In the case of the figure studied, the fumes derived from the second (No. 2) fume cooler evaporator 33 pass through the fourth (No. 4) three-way valve 53 to go into the first (No. 1) anti-sublimation evaporator 39. In this figure case, the fumes do not go into the second (No. 2) anti-sublimation evaporator 40.

These fumes are cooled from their inlet temperature, which is about −72° C., to the $CO_2$ anti-sublimation temperature, which is either equal to −78.6° C., or equal to −80° C., depending on whether the pressure in the first (No. 1) anti-sublimation evaporator 39 is 1 bar absolute or 0.85 bar absolute, respectively. Once this temperature has been reached, the $CO_2$ is iced, on the inside of the first (No. 1) anti-sublimation evaporator 39, on the outer wall of the pipeline in which the refrigerant mixture circulates.

Before penetrating into the first (No. 1) anti-sublimation evaporator 39, the refrigerant liquid enters, at about −45° C., the second (No. 2) anti-sublimation evaporator 40, which operates as a subcooling exchanger. The refrigerant fluid is subcooled from −45° C. to −78° C. at the beginning of the defrosting cycle of $CO_2$ and only from −45° C. to −55° C. at the end of the defrosting cycle of $CO_2$. During the defrosting, liquid $CO_2$ accumulates at the bottom part of the second (No. 2) anti-sublimation evaporator 40. Before switching over the operation of the second (No. 2) anti-sublimation evaporator 40 to evaporation mode and at the end of the liquefaction of $CO_2$, the third (No. 3) three-way valve 47 is open. It is then possible to suction the liquid $CO_2$ by means of the pump 48 (the pump for suctioning liquid $CO_2$). The pump 48 is, e.g., an electric pneumatic pump, making it possible to suction both liquid and gas. The pump 48 transfers the liquid $CO_2$ into the storage reservoir 49, then suctions the $CO_2$ vapors mixed with the nitrogen until restoring the gaseous atmosphere of the second (No. 2) anti-sublimation evaporator 40 to the operating pressure, i.e., 0.85 bar absolute, or 1 bar absolute, depending on the technical option chosen for the circulation of the fumes. For practical reasons, in particular for vehicles, a removable reservoir 51 is connected to the storage reservoir 49. The pump 50 (the pump for filling the removable reservoir) makes possible the filling of the removable reservoir 51 from the storage reservoir 49. The valve 52 makes possible the equalization of the pressures between the two reservoirs 49 and 51, if necessary. The removable reservoir 51 makes possible the transport of the captured $CO_2$. A new removable, emptied reservoir replaces the one that was filled.

The circulation of the nitrogen exiting from the first (No. 1) anti-sublimation evaporator 39 will be described now. The nitrogen vapors pass through the fifth (No. 5) three-way valve 54, then rejoin the pipeline for discharging nitrogen to the air 55. The fifth (No. 5) three-way valve 54 puts, depending on the case, the pipeline for discharging nitrogen to the air 55 in communication either with the first (No. 1)

anti-sublimation evaporator 39, or with the second (No. 2) anti-sublimation evaporator 40.

During the defrosting, the pressure rises due to sublimation of $CO_2$ in the anti-sublimation evaporators 39 and 40, which are thus in closed circuit. At the equilibrium temperature of the triple point, the pressure is equal to 5.2 bar. At this pressure, the $CO_2$ passes from the solid state to the liquid state.

The nitrogen flow $M_{N2}$ in the pipeline for discharging nitrogen to the air 55 represents no more than 71.9% of the initial mass flow of the fumes. The pressure of the nitrogen alone is equal to 0.736 bar, without taking into account either charge losses or trace gases.

The pipeline 2 of the outlet of the heat engine 1, the fume pipeline 13 and the pipeline for discharging nitrogen to the air 55 are in communication; they constitute a same circuit.

The elimination of the water in the exchanger for cooling the fumes 11, in the first (No. 1) fume cooler evaporator 25 and in the dehydrator 56, would lead to a decrease in pressure in the pipelines 2, 13, 55, if same was not compensated: The atmospheric air would penetrate into the refrigerating apparatus via the pipeline 55 for discharging nitrogen to the air. Likewise, the anti-sublimation of $CO_2$ in the anti-sublimation evaporators 39 and 40 would lead to a new decrease in pressure. This lowering of pressure must be compensated so that the nitrogen may be discharged to the atmosphere. The solution shown in FIG. 3 is that of an air compressor 57 injecting an air flow via the pipeline 58 (the injection pipeline of the venturi tube) to the neck of a venturi tube 59, making possible the suction of the nitrogen flow at a pressure of about 0.65 bar and prohibiting the entry of air into the system. This solution also has the advantage of recreating a mixture of nitrogen and oxygen at the outlet of the venturi tube.

Another solution, not shown in FIG. 3, is to put in place a blower type compressor with a low pressure variation, at the outlet of the fume cooling exchanger 11, in the fume pipeline 13, to create the overpressure that makes possible the return to the atmosphere of the nitrogen flow or of the nitrogen flow with added trace components at the outlet of the pipeline for discharging nitrogen to the air 55.

If the contents of the trace components and in particular those of carbon oxide CO and some light hydrocarbons are non-negligible, the flows of nitrogen and trace components can be returned into a mixer with an additional, suitable air flow to create a so-called low combustible mixture. The combustion of this combustible mixture is favorable to the reduction of pollutants and to increasing the energy efficiency of a heat engine designed for this purpose.

It will be noted that, during the defrosting of the $CO_2$ on the operating anti-sublimation exchanger, the temperature varies between −80 and −55° C. This significant variation of temperature may be used for the regulation of the alternation of the two anti-sublimation evaporators. In fact, when the temperature of −55° C. is reached during the defrosting of $CO_2$, it may be considered that the $CO_2$ has passed entirely into the liquid phase. The pump 48 can then be set in motion to suction the liquid $CO_2$ for transfer into the storage reservoir 49. It is thus possible, by measuring the pressures in the interior volume of the $CO_2$ defrosting evaporator, to stop the emptying process and then to restart the cycle by evaporating the refrigerant in this anti-sublimation evaporator, which has been previously emptied of its liquid $CO_2$. It will be noted that at the beginning of the cycle, when no evaporator is iced, the integrated, cascaded compression system consumes more energy. In fact, the mixture that is released into the anti-sublimation evaporator is not sub-cooled. The energy optimization takes into account the most likely operating times of the engine, the energy production process, etc. for setting the rhythm of alternations between the two evaporators.

The invention claimed is:

1. A method for extracting carbon dioxide from fumes, including nitrogen and carbon dioxide, derived from the combustion of hydrocarbons in an apparatus designed in particular for the production of mechanical energy;

said method comprising the step of cooling said fumes at a pressure more or less equal to atmospheric pressure at a temperature such that the carbon dioxide passes directly from the vapor state to the solid state via an anti-sublimation process;

said method being characterized in that, to cool the mixture of nitrogen and carbon dioxide:

frigories are supplied by means of a fractionated distillation, at decreasing, multi-stage temperatures, of a mixture of refrigerant fluids according to a cycle comprising a compression phase and successive condensation and evaporation phases.

2. Method in accordance with claim 1, wherein the step of cooling said fumes at a pressure more or less equal to atmospheric pressure at a temperature such that the carbon dioxide passes directly from the vapor state to the solid state via an anti-sublimation process is followed by:

a step of melting the carbon dioxide in a closed chamber; the pressure and temperature in said closed chamber progressing up to the triple point of carbon dioxide, as the mixture of refrigerant fluids, while subcooling, supplies calories in said chamber.

3. Method in accordance with claim 2, wherein the mixture of refrigerant fluids successively ensures the melting of the carbon dioxide in said closed chamber and the anti-sublimation of the carbon dioxide circulating in an open circuit in an other chamber, the melting and anti-sublimation of the carbon dioxide being alternately carried out in one and the other of said chambers, one closed, the other open.

4. Method in accordance with any of the claim 2 or 3, said method additionally comprising:

the step of storing the carbon dioxide in liquid form in a removable reservoir.

5. Method in accordance with claim 4, wherein the step of storing the carbon dioxide in liquid form in the removable reservoir comprises the following steps:

suctioning the liquid carbon dioxide contained in said closed chamber, restoring the pressure in said closed chamber to a pressure close to atmospheric pressure, and transferring the liquid carbon dioxide into said reservoir.

6. Method in accordance with any of the claims 1 through 3, said method additionally comprising:

the step of discharging nitrogen to the outer air after successive and separate extractions of water and carbon dioxide vapors contained in said fumes.

7. Method in accordance with claim 6, said method additionally comprising:

the step of transferring the frigories contained in the nitrogen discharged to the outer air to the fumes and thus contributing to the cooling of said fumes.

8. Method in accordance with any of the claims 1 through 3, said method additionally comprising:

the step of cooling said fumes to the anti-sublimation temperature of carbon dioxide at a pressure more or less equal to atmospheric pressure, using the heat energy available in said fumes without additional supply of energy.

9. Method in accordance with claim 8, wherein, to use the heat energy available in said fumes, said method additionally comprises the following steps:
reheating and then of vaporizing water by means of said fumes to produce water vapor under pressure,
releasing said water vapor under pressure into a turbine that produces either mechanical or electric energy.

10. Method in accordance with any of the claims 1 through 3, wherein the step of cooling said fumes at a pressure more or less equal to atmospheric pressure at a temperature such that the carbon dioxide passes directly from the vapor state to the solid state via an anti-sublimation process additionally comprises:
the step of extracting water from said fumes in liquid form at a pressure more or less equal to atmospheric pressure.

11. Method in accordance with claim 10, wherein an air or water exchanger is used to extract all or part of the water from said fumes in liquid form at a pressure more or less equal to atmospheric pressure.

12. Method in accordance with claim 11, said method additionally comprising:
the step of extracting substantially the entire residual quantities of water in said fumes, using at least one of a refrigerating exchanger and a dehydrator.

13. System for extracting carbon dioxide from fumes, including nitrogen and carbon dioxide, derived from the combustion of hydrocarbons in an apparatus designed for the production of mechanical energy;
said system comprising cooling means for cooling said fumes at a pressure more or less equal to atmospheric pressure at a temperature such that the carbon dioxide passes directly from the vapor state to the solid state via an anti-sublimation process;
said system being characterized in that:
said cooling means for cooling said fumes at a pressure more or less equal to atmospheric pressure at a temperature such that carbon dioxide passes directly from the vapor state to the solid state via an anti-sublimation process additionally comprise an integrated, cascaded refrigerating apparatus to cool the mixture of nitrogen and carbon dioxide by supplying frigories by means of a fractionated distillation, at decreasing, multistage temperatures, of a mixture of refrigerant fluids according to a cycle comprising a compression phase and successive condensation and evaporation phases;
said refrigerating apparatus comprising:
a compressor,
a partial condenser,
a separator reservoir,
evaporation condensers which condense one fluid while evaporating another fluid,
fume cooling evaporators,
liquid-vapor exchangers,
anti-sublimation evaporators, and pressure reducing valves.

14. System in accordance with claim 13, said system additionally comprising:
a closed chamber passed through by a circuit in which a mixture of refrigerant fluids circulates;
the pressure and temperature in said closed chamber progressing up to the triple point of carbon dioxide, as:
the mixture of refrigerant fluids, while subcooling, supplies calories in said chamber,
said carbon dioxide passes from the solid state to the liquid state.

15. System in accordance with claim 14, wherein said mixture of refrigerant fluids successively ensures the melting of the carbon dioxide in said closed chamber and the anti-sublimation of the carbon dioxide circulating in open circuit in an open chamber symmetrical to the closed chamber, the melting and anti-sublimation of the carbon dioxide being alternately carried out in one and the other of said closed chamber and said open chamber.

16. System in accordance with any of the claim 14 or 15, said system additionally comprising:
storage means, in particular at least one of a fixed reservoir and a removable reservoir for storing the carbon dioxide in liquid form.

17. System in accordance with claim 16, wherein said means for storing carbon dioxide in liquid form in the at least one of the fixed reservoir and the removable reservoir comprise additionally a pneumatic pump for:
suctioning the liquid carbon dioxide contained in said closed chamber,
restoring the pressure in said closed chamber at a pressure close to atmospheric pressure,
transferring the liquid carbon dioxide into said reservoir.

18. System in accordance with any of the claims 13 through 15, said system additionally comprising:
at least one of compression means and suction means for discharging nitrogen to the outer air after successive extractions of water and carbon dioxide vapors contained in said fumes.

19. System in accordance with claim 18, said system additionally comprising:
transfer means for transferring the frigories contained in the nitrogen discharged to the outer air to the fumes and thus contributing to the cooling of said fumes.

20. System in accordance with any of the claims 13 through 15, said system additionally comprising:
means for recovering the heat energy available in said fumes for cooling, without the additional supply of energy, said fumes to the anti-sublimation temperature of carbon dioxide at a pressure more or less equal to atmospheric pressure.

21. System in accordance with claim 20, wherein said means for recovering the heat energy available in said fumes comprise:
an exchanger, for reheating and vaporizing water by means of said fumes and for producing water vapor under pressure,
a turbine, for releasing said water vapor under pressure and producing the mechanical or electric energy.

22. System in accordance with any of the claims 13 through 15, wherein said means for cooling said fumes at a pressure more or less equal to atmospheric pressure at a temperature such that the carbon dioxide passes directly from the vapor state to the solid state via an anti-sublimation process additionally comprising:
exchangers, for extracting water from said fumes in liquid form at a pressure more or less equal to atmospheric pressure.

23. System in accordance with claim 22, wherein said exchangers comprise at least one of an air exchanger and a water exchanger.

24. System in accordance with claim 23, wherein said extracting means for extracting the entire residual quantities of water in said fumes comprise at least one of a refrigerating exchanger and a dehydrator.

* * * * *